Nov. 18, 1941.   L. C. TALLMAN   2,263,252
LIQUID LEVEL CONTROL
Filed March 9, 1939
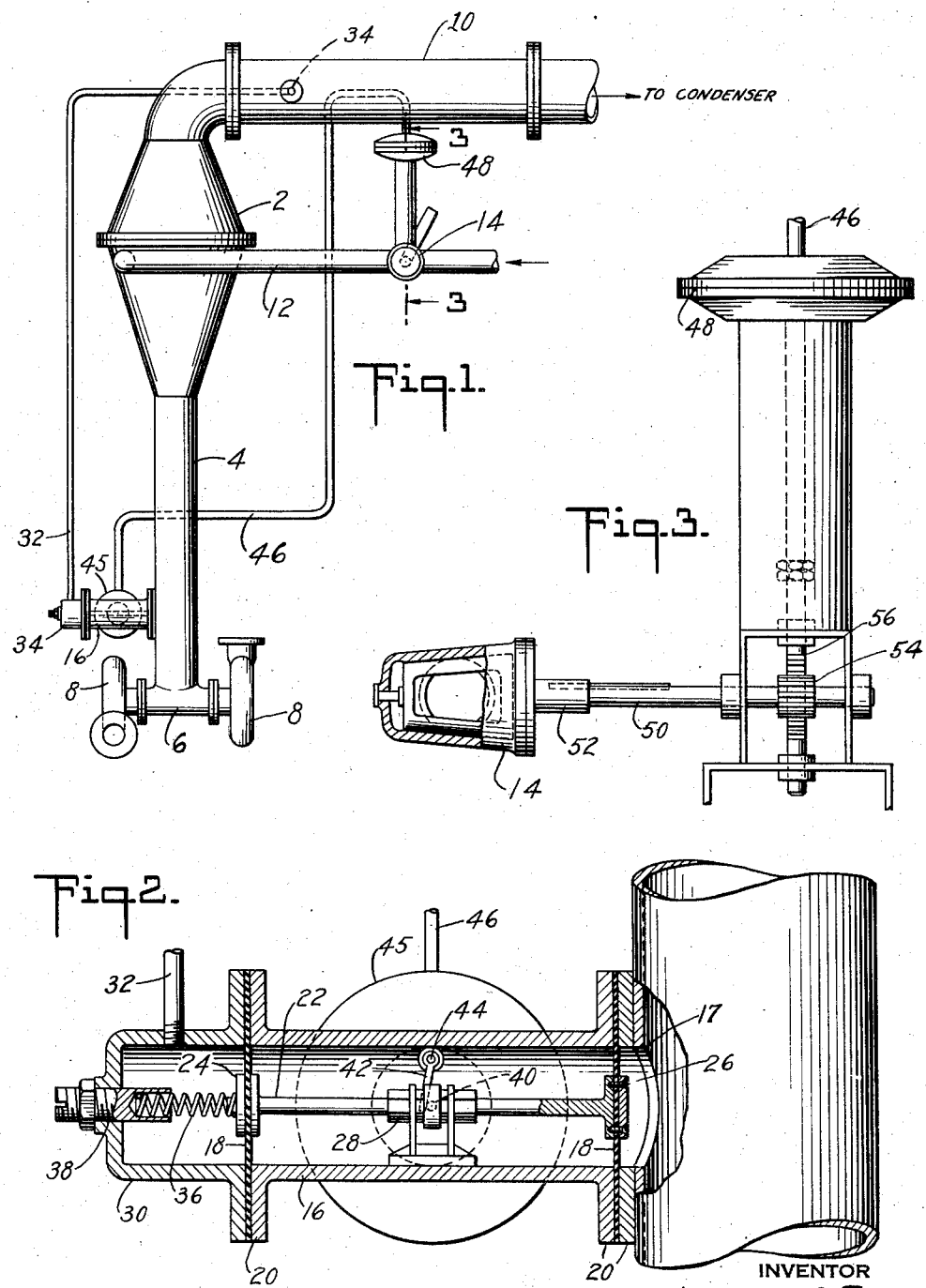
INVENTOR
LAURENCE C. TALLMAN
BY
ATTORNEYS Patented Nov. 18, 1941

2,263,252

UNITED STATES PATENT OFFICE 2,263,252

LIQUID LEVEL CONTROL

Laurence C. Tallman, Rochester, N. Y., assignor to Beech-Nut Packing Company, Canajoharie, N. Y., a corporation of New York Application March 9, 1939, Serial No. 260,784

2 Claims. (Cl. 137—68)

The present invention relates to devices for controlling the level of liquid in a container, and has special reference to devices of this character that are particularly adapted for use in connection with a deaerator for tomato and other juices previously to canning.

The principal object of the invention is to provide a device of the character indicated which is simple in construction and reliable and efficient in use.

Referring to the drawing:

Figure 1 is a side elevation of a portion of a deaerating apparatus having my improved device in its preferred form applied thereto;

Fig. 2 is a detail view corresponding to a portion of Fig. 1 but on an enlarged scale and with certain parts in section; and Fig. 3 is a detail sectional elevation, on an enlarged scale, taken on the line 3—3 of Fig. 1.

The deaerator illustrated in the drawing may be a part of a system for use in treating tomato juice and other vegetables and fruit juices as they are fed to the can-filling machines.

As shown, the deaerator comprises a flash chamber 2 having a lower extension or leg 4 which is connected through a T-shaped portion 6 with two centrifugal pumps 8. One of these pumps is operated at a time, the other being a spare in case of failure. The upper end of the flash chamber 2 is fastened to a pipe 10 which may be connected to a suitable condenser, not shown. The tomato juice is conducted into the flash chamber through a pipe 12 which is controlled by a plug valve 14.

The amount of vapor entering the condenser is dependent upon the vacuum being maintained in the flash chamber, and the temperature of the incoming liquid. For practical purposes, there may be one per cent. vapor flashed over from the flash chamber to each ten degrees temperature drop of the liquid upon entering the flash chamber. For convenience in operation, the juice may be admitted to the flash chamber at a temperature of 140 degrees Fahrenheit, and there may be maintained a vacuum in the flash chamber corresponding to a boiling temperature of 130 degrees which is approximately 4.7″ mercury absolute.

When the juice enters the flash chamber it immediately boils. Upon boiling, the latent heat in part of the juice is given up to promote the boiling. The juice then drops to the bottom of the leg 4 and the vapor which represents about one per cent. of the incoming liquid, goes to the condenser through the pipe 10. The juice in the bottom of this leg 4 is picked up by one of the centrifugal pumps and pumped through a heater (not shown) to the filling machines.

When all filling machines are running at maximum capacity, it may require approximately one hundred gallons of juice per minute. If, however, any of the filling machines stop for any reason, it will be seen that the leg 4 and chamber 2 would soon fill up with the juice, and the juice would then go through pipe 10 into the condenser and from there to the sewer.

In accordance with the present invention, my improved device is adapted to control the flow of juice entering the flash chamber. This device comprises a T-pipe 16 which is in communication with the interior of the leg 4 through an opening 17. On the two parallel faces of the T are fastened two rubber diaphragms 18, the rubber diaphragms being clamped between flanges 20. These diaphragms at their mid-sections carry a rod 22, the ends of which are secured to the diaphragms by disks 24, the disks 24 being secured to flanges on the ends of the rod by screws 26.

This rod is made in two sections that are coupled together by a turn-buckle 28. By turning this turn-buckle in opposite directions the diaphragms may be deflected toward and from each other. The turn-buckle enables the length of the rod to be adjusted so that under normal conditions, the two diaphragms will be parallel and under no stress. The diaphragm at the outer end of the T 16 is capped with a chamber 30 so that the atmospheric pressure on that side of the diaphragm may be lowered. Leading from the chamber 30 is a pipe 32 which is in communication at 34 with the interior of the condenser pipe 10.

When the vacuum is drawn on the system, if there is no juice entering the flash chamber 2, the pressure on the outside of both diaphragms 18 is equal. When, however, juice is permitted to run into the flash chamber through valve 14 and none is taken out through either of the pumps 8, the liquid will rise in leg 4, thereby covering the diaphragm adjacent the opening 17.

The height to which this juice rises determines the pressure that is effective on said diaphragm. In order to compensate for this weight, there is attached a spring 36 back of the diaphragm at the outer end of the T 16. By adjusting a screw 38 which is screw-threaded through an aperture in the outer end of the chamber 30, and engages the outer end of the spring 36, the tension of the spring may be adjusted, thereby controlling the movement of the rod 22 in a horizontal plane.

Means is provided for limiting the travel of the rod 22 caused by surges or other causes, the travel of the rod being preferably limited to three-eighths of an inch. On one side of the turn-buckle 28, there is a pin 40 on which rides a crank-arm 42 on a shaft 44, so that any longitudinal movement of the rod 22 is translated into rotary motion of the shaft 44. This shaft 44 is connected through a device 45 whereby when the shaft is turned, air is admitted or restricted in a pipe 46. This device may be of any suitable construction, such as the conventional Taylor fulscope regulator.

The pipe 46 is connected to an air-operated diaphragm motor 48 for controlling the valve 14. The motor 48 is provided with a horizontal shaft 50 which is secured to the plug stem 52 of the valve 14. The shaft carries a pinion 54 which is engaged with a vertically arranged rack 56 connected with the operating mechanism of the diaphragm motor 40.

Any variation in air pressure on the top of the diaphragm of the motor 48 due to the admission of air through the pipe 46, causes a vertical motion of the rack 56 which through the shaft 50 rotates the plug of the valve 14 to control the amount of juice entering the flash chamber.

From the foregoing it will be apparent that my improved device is adapted to accurately control the level of the liquid within the leg 4 leading from the flash chamber, and the same is effected through controlling the amount of juice entering the chamber through the valve 14.

Thus there is no danger of too great a quantity of the juice entering the flash chamber in case the filling machines, owing to one or more of them becoming inoperative, inadequately take care of the juice which would normally pass through the flash chamber.

As will be evident to those skilled in the art my invention permits various modifications without departing from the spirit thereof or the scope of the appended claims.

What I claim is:

1. In an apparatus of the class described, the combination of a chamber, a vacuum connection leading from the upper part of the chamber, means for admitting liquid to the chamber, a valve for controlling the admission of liquid through said means, an opening in the lower part of the chamber, a diaphragm opposite said opening, a second diaphragm, a casing enclosing the two diaphragms, connections between the central portions of the diaphragms to cause them to move together, means for maintaining a vacuum in said casing adjacent the outer side of said second mentioned diaphragm corresponding to the degree of vacuum in the upper portion of said chamber, and connections between said diaphragms and said valve for controlling the admission of liquid to said chamber in accordance with variations in the level of the liquid within the chamber.

2. In an apparatus of the class described, the combination of a chamber, a vacuum connection leading from the upper part of the chamber, means for admitting liquid to the chamber, a valve for controlling the admission of liquid through said means, an opening in the lower part of the side wall of the chamber, a diaphragm closing said opening, a second diaphragm spaced outwardly from the first diaphragm, connections between the diaphragms to cause them to move together, a casing enclosing the outer side of the second-mentioned diaphragm, means for maintaining a vacuum in said casing corresponding to the degree of vacuum in the upper portion of said chamber, and connections between said diaphragms and said valve for controlling the admission of liquid to said chamber in accordance with variations in the level of the liquid within the chamber.

LAURENCE C. TALLMAN.